US 6,641,651 B2

(12) United States Patent
Suzuki et al.

(10) Patent No.: US 6,641,651 B2
(45) Date of Patent: Nov. 4, 2003

(54) INK-JET INK, INK CARTRIDGE AND RECORDING UNIT, AND INK-JET RECORDING PROCESS AND INK-JET RECORDING APPARATUS USING THE SAME

(75) Inventors: Mariko Suzuki, Kanagawa (JP); Shoji Koike, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 123 days.

(21) Appl. No.: 09/879,213

(22) Filed: Jun. 13, 2001

(65) Prior Publication Data

US 2002/0037947 A1 Mar. 28, 2002

(30) Foreign Application Priority Data

Jun. 15, 2000 (JP) .......................................... 2000-179702

(51) Int. Cl.$^7$ .............................................. C09D 11/00
(52) U.S. Cl. ................. 106/31.58; 106/31.43; 106/31.86; 106/31.75
(58) Field of Search .................... 106/31.58, 31.43, 106/31.86, 31.75

(56) References Cited

U.S. PATENT DOCUMENTS

| 4,957,553 | A | | 9/1990 | Koike et al. ................. 106/20 |
| 5,099,255 | A | | 3/1992 | Koike et al. ................. 346/1.1 |
| 5,122,814 | A | | 6/1992 | Endo et al. ................. 346/33 |
| 5,159,349 | A | | 10/1992 | Endo et al. ................. 346/33 |
| 5,521,621 | A | | 5/1996 | Endo et al. ................. 347/15 |
| 5,560,770 | A | * | 10/1996 | Yatake ................. 106/31.43 |
| 5,754,194 | A | | 5/1998 | Endo et al. ................. 347/15 |
| 5,938,829 | A | * | 8/1999 | Higashiyama et al. ... 106/31.58 |
| 5,976,233 | A | * | 11/1999 | Osumi et al. ............ 106/31.86 |
| 6,004,389 | A | * | 12/1999 | Yatake ..................... 106/31.86 |
| 6,013,124 | A | * | 1/2000 | Saibara et al. .......... 106/31.86 |
| 6,025,412 | A | * | 2/2000 | Sacripante et al. ......... 523/161 |
| 6,123,502 | A | * | 9/2000 | Adams et al. ........... 414/752.1 |
| 6,280,513 | B1 | * | 8/2001 | Osumi et al. .............. 106/31.6 |
| 6,379,441 | B1 | * | 4/2002 | Kanaya et al. .......... 106/31.49 |
| 6,454,844 | B1 | * | 9/2002 | Kanaya ..................... 106/31.48 |
| 6,454,846 | B2 | * | 9/2002 | Yatake ..................... 106/31.58 |

FOREIGN PATENT DOCUMENTS

| EP | 397431 | 11/1990 |
| JP | 61-155481 | 7/1986 |
| JP | 61-59911 | 12/1986 |
| JP | 61-59912 | 12/1986 |
| JP | 61-59914 | 12/1986 |

* cited by examiner

*Primary Examiner*—Mark L. Bell
*Assistant Examiner*—Veronica F. Faison
(74) *Attorney, Agent, or Firm*—Fitzpatrick, Cella, Harper & Scinto

(57) ABSTRACT

The invention provides an ink-jet ink comprising (A) diethylene glycol, (B) at least one of trimethylolpropane and ethyleneurea, (C) a glycol having a vapor pressure lower than that of diethylene glycol at 20° C., (D) a coloring material, and (E) water, wherein the total amount of the components (A), (B) and (C) is 10 to 40% by weight based on the total weight of the ink. The ink is hard to undergo a change in ink composition even when the ink is used in ejection with no recording or ejection-recovery operation, and also hard to undergo a change in ink properties even when the ink composition is changed.

23 Claims, 6 Drawing Sheets

INK-JET INK, INK CARTRIDGE AND RECORDING UNIT, AND INK-JET RECORDING PROCESS AND INK-JET RECORDING APPARATUS USING THE SAME

BACKGROUND OF THE INVENTION

1. Field of the Invention

The present invention relates to an ink-jet ink, an ink cartridge and a recording unit, an ink-jet recording process and an ink-jet recording apparatus using the same, and a method of stabilizing ink ejection properties.

2. Related Background Art

An ink-jet recording method is a recording method in which fine droplets of an ink are ejected to apply the ink to a recording medium such as paper, thereby conducting recording. In particular, according to the ink-jet recording method disclosed in Japanese Patent Publication Nos. 61-59911, 61-59912 and 61-59914, in which an electrothermal converter is used as an ejection-energy-supplying means for an ink, and thermal energy is applied to the ink to generate bubbles, thereby forming droplets of the ink, recording by an On-Demand system and a recording head of a high-density multi-orifice can be realized with ease, and high-resolution and high-quality images can be recorded at a high speed.

However, in such an ink-jet recording method, the interior of a nozzle of a recording head for ejecting the ink communicate with the atmosphere, and so there may occur drying of the ink within the nozzle as well as clogging due to the penetration of foreign matter, bubbles, etc. from the atmosphere in some cases. In order to solve such a problem, there is conducted an ejection operation with no recording, in which an ink is ejected from all nozzles of a recording head toward an ink receiving member (cap), or an ejection-recovery operation, in which the faces of the nozzles of the recording head are capped to apply negative pressure to the nozzle faces by a sucking means such as a pump, thereby forcedly ejecting the ink from the nozzles to solve the clogging of the nozzles. At this time, in the case of, particularly, a long recording head in which a number of nozzles are arranged, or the like, a large amount of the ink is ejected by the above-described ejection operation with no recording or ejection-recovery operation irrespective of a recording operation. Therefore, such an operation involves a problem that the amount of the ink consumed is increased to raise the running cost of the apparatus. Thus, an ink-jet recording apparatus equipped with a structure in which a large amount of the ink ejected by the ejection with no recording or the ejection-recovery operation can be recycled has also been developed.

SUMMARY OF THE INVENTION

However, a large amount of the ink ejected at the time when a physical operation for preventing the clogging of nozzles, such as the above-described ejection with no recording or ejection-recovery operation, is conducted may undergo changes in its ink composition and ink properties in some cases due to evaporation of water and the like by exposure to the atmosphere. When such a recycled ink is used for recording, therefore, image quality may be impaired in some cases.

In an ink-jet recording apparatus of the On-Demand system in particular, an ink is not always ejected from all nozzles, but only an ink required for the formation of an image is ejected from some nozzles in case of necessity. Therefore, a state that no ink flows in a nozzle often occurs. When the state that no ink flows in a nozzle continues over a long period of time, specifically, for example, when there occurs such a situation that the time period during which an ink within a nozzle confronts a recording medium without being subjected to no ejection-recovery operation exceeds 5 seconds, a coloring material may crust at, particularly, an orifice part of the recording head in some cases due to evaporation of water and the like from the orifice, resulting in clogging at the orifice to fail to smoothly conduct recording. As a countermeasure against such a phenomenon, the ejection with no recording or ejection-recovery operation is conducted as described above. When the ink used in the ejection with no recording or ejection-recovery operation is recycled, however, the recycled ink may undergo changes of its ink composition and ink properties in some cases due to evaporation of water and the like by exposure to the atmosphere as described above. Therefore, this phenomenon may become particularly remarkable in some cases. Further, when the evaporation of water and the like from the orifice occurs, the ink tends to cause viscosity increase at the orifice part of the head, and its start-up properties may be deteriorated in some cases.

Further, the present inventors have had a finding that there is a possibility that the deterioration of such start-up properties as described above and the like may become a more serious problem in an ink-jet printer in which images and the like are recorded while a recording head is fixed. More specifically, in the case of an ink-jet printer which makes a record of images and the like by scanning a recording head, the state that no ink flows in a nozzle can be prevented from continuing over a long period of time, since an ejection-recovery operation can be frequently conducted in the course of a recording operation. In the ink-jet printer in which the recording head is fixed during a recording operation, however, it is difficult to conduct the ejection-recovery operation of the recording head in the course of the recording operation, and so such a situation that the state that no ink flows in a nozzle continues over a long period of time tends to occur. The present inventors have been led to the recognition that when an ink used for the ejection-recovery operation in such a printer is intended to be recycled, a countermeasure against a change in ink composition of the recycled ink and a resultant change in ink-jet ejection properties is a more important technical problem.

It is accordingly an object of the present invention to provide an ink-jet ink which is hard to undergo a change in ink composition even when it is recycled after used in the above-described ejection with no recording or ejection-recovery operation, since the ink is hard to undergo evaporation of water and a solvent, or hard to undergo a change in ink ejection properties even when the ink composition is changed, so as to stably exhibit good ejection properties.

Another object of the present invention is to provide an ink-jet recording process by which a high-quality recorded article can be obtained at a reasonable cost.

A further object of the present invention is to provide an ink-jet recording apparatus by which a high-quality recorded article can be stably obtained at a reasonable cost, and an ink cartridge and a recording unit which can be used in such a recording apparatus.

A still further object of the present invention is to provide a method of stabilizing ink ejection properties in an ink-jet printer equipped with a mechanism with which an ink is recycled.

The above objects can be achieved by the present invention described below.

According to an embodiment of the present invention, there is thus provided an ink-jet ink comprising (A) diethylene glycol, (B) at least one of trimethylolpropane and ethyleneurea, (C) a glycol having a vapor pressure lower than that of diethylene glycol at 20° C., (D) a coloring material, and (E) water, wherein the total amount of the components (A), (B) and (C) is 10 to 40% by weight based on the total weight of the ink.

According to an embodiment of the present invention, there is also provided an ink cartridge comprising an ink container portion containing the ink described above.

According to an embodiment of the present invention, there is further provided a recording unit comprising an ink container portion containing the ink described above, and a head portion for ejecting the ink therefrom.

According to an embodiment of the present invention, there is still further provided an ink-jet recording process, comprising the step of ejecting an ink from an orifice toward a recording surface with an On-Demand system by applying energy to an ink comprising (A) diethylene glycol, (B) at least one of trimethylolpropane and ethyleneurea, (C) a glycol having a vapor pressure lower than that of diethylene glycol at 20° C., (D) a coloring material, and (E) water, wherein the total amount of the components (A), (B) and (C) is 10 to 40% by weight based on the total weight of the ink.

According to an embodiment of the present invention, there is yet still further provided an ink-jet recording apparatus, comprising a recording head for ejecting the ink described above therefrom, and an ink cartridge having an ink container portion containing the ink.

According to another embodiment of the present invention, there is yet still further provided an ink-jet recording apparatus, comprising a recording unit having an ink container portion containing the ink described above and a head for ejecting the ink therefrom.

According to a further embodiment of the present invention, there is yet still further provided an ink-jet recording apparatus, comprising an ink container portion containing an ink comprising (A) diethylene glycol, (B) at least one of trimethylolpropane and ethyleneurea, (C) a glycol having a vapor pressure lower than that of diethylene glycol at 20° C., (D) a coloring material, and (E) water, wherein the total amount of the components (A), (B) and (C) is 10 to 40% by weight based on the total weight of the ink, a recording head for ejecting the ink therefrom, and a means for collecting the ink ejected from the recording head in the ink container portion.

According to a still further embodiment of the present invention, there is yet still further provided an ink-jet recording apparatus, comprising an ink container portion containing an ink comprising (A) diethylene glycol, (B) at least one of trimethylolpropane and ethyleneurea, (C) a glycol having a vapor pressure lower than that of diethylene glycol at 20° C., (D) a coloring material, and (E) water, wherein the total amount of the components (A), (B) and (C) is 10 to 40% by weight based on the total weight of the ink, a recording head for ejecting the ink therefrom, an ink-receiving member for receiving the ink ejected from the recording head, an ink flow path connecting the ink-receiving member to the ink container portion, and a pump for collecting the ink received with the ink-receiving member in the ink container portion.

According to another embodiment of the present invention, there is yet still further provided an ink-jet recording process using the ink-jet recording apparatus described above, which comprises the step of ejecting an ink containing the ink-jet ink previously ejected at least once from the recording head.

According to a further embodiment of the present invention, there is yet still further provided an ink-jet recording process, comprising the step of ejecting an ink containing an ink-jet ink previously ejected at least once from a recording head, wherein the ink-jet ink is an ink-jet ink comprising (A) diethylene glycol, (B) at least one of trimethylolpropane and ethyleneurea, (C) a glycol having a vapor pressure lower than that of diethylene glycol at 20° C., (D) a coloring material, and (E) water, wherein the total amount of the components (A), (B) and (C) is 10 to 40% by weight based on the total weight of the ink.

According to a further embodiment of the present invention, there is yet still further provided a method of stabilizing ink ejection properties in an ink-jet recording process comprising the step of ejecting an ink containing an ink-jet ink previously ejected at least once from a recording head, wherein the ink-jet ink comprises (A) diethylene glycol, (B) at least one of trimethylolpropane and ethyleneurea, (C) a glycol having a vapor pressure lower than that of diethylene glycol at 20° C., (D) a coloring material, and (E) water, wherein the total amount of the components (A), (B) and (C) is 10 to 40% by weight based on the total weight of the ink.

DESCRIPTION OF THE PREFERRED EMBODIMENTS

Figure 1:
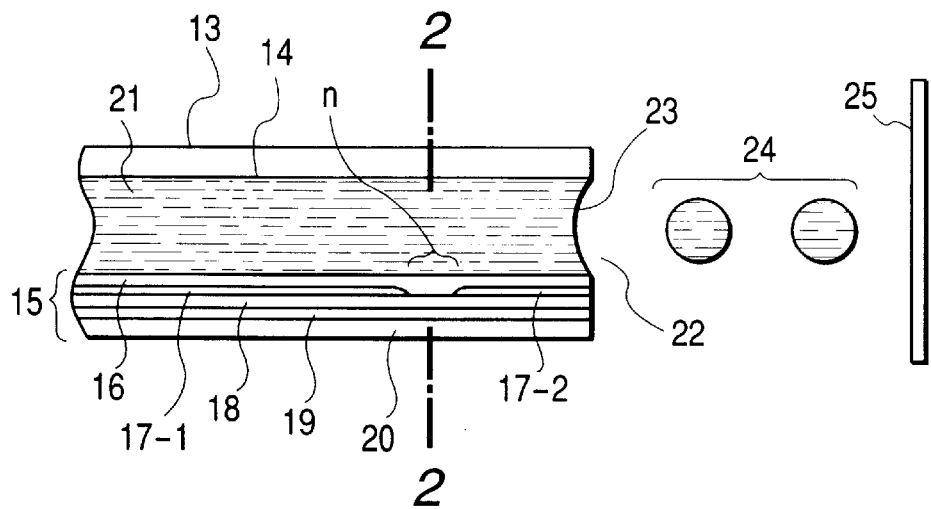
FIG. 1 is a longitudinal cross-sectional view illustrating an embodiment of a head of an ink-jet recording apparatus according to the invention.

The present invention will hereinafter be described in detail by embodiments.

The ink-jet ink according to the present invention is a water-based ink and comprises, as essential components of the ink, five components of (A) diethylene glycol, (B) at least one of trimethylolpropane and ethyleneurea, (C) a glycol having a vapor pressure lower than that of diethylene glycol at 20° C., (D) a coloring material, and (E) water, and contains three components of (A), (B) and (C) within the range of from 10 to 40% by weight, preferably from 15 to 30% by weight based on the total weight of the ink. The present inventors have found that taking the above-described constitution of an ink-jet ink, evaporation of water and a solvent component in the ink can be effectively prevented to inhibit a change in ink composition of the ink, even if the ink is exposed to the atmosphere, and that a change in ink ejection properties can be made hard to occur even if the ink composition is changed due to evaporation of water, and the like, and so good ejection properties can be stably achieved even when the ink is recycled to use, thus leading to completion of the present invention.

In the ink-jet ink according to the present invention, it is preferable that each of the three components of (A), (B) and (C) be contained in the range of from 1 to 20% by weight, preferably from 2 to 18% by weight, more preferably from 3 to 15% by weight. When these three components are mixed in, for example, the above respective amounts to prepare an ink in such a manner that the total content of these components amounts to 10 to 40% by weight based on the total weight of the ink, the evaporation of water in a ejection passage or a recycle passage within an ink-jet recording apparatus can be more effectively prevented, and not only evaporation of water, but also evaporation of the solvent component can be prevented even when the ink is exposed to very severe drying conditions caused by ejection with no recording or an ejection-recovery operation. Therefore, an inhibitory effect on precipitation of the coloring material and an inhibitory effect on viscosity increase of the ink can be achieved.

As a result, even the recycled ink exhibits substantially the same ink ejection properties as in the ink before recycling. In addition, since clogging and viscosity increase due to precipitation of the coloring material can also be prevented, the start-up properties and resistance to crusting of the ink are also improved. Accordingly, the ink according to the present invention can be effectively used in, particularly, an ink-jet recording apparatus of the On-Demand system and an ink-jet recording apparatus in which a part of an ink is recovered after passing through a nozzle, and the recovered ink is used again in recording.

Among the requirements for constituting the ink according to the present invention, examples of the glycol having a vapor pressure lower than that of diethylene glycol at 20° C. as recited in (C) include triethylene glycol, tetraethylene glycol and polyethylene glycols having a weight average molecular weight of about 400.

As examples of the coloring material as recited in (D), dyes and pigments heretofore used in ink-jet inks may be used without any problem. Examples of the dyes include reactive dyes, acid dyes, direct dyes, basic dyes and disperse dyes. Among these, preferably used are the reactive dyes, acid dyes and dyes represented by the formula

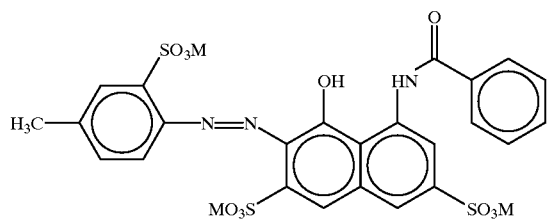

-continued

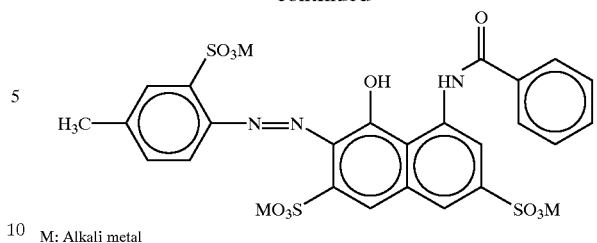

M: Alkali metal

In order to retain a high image density and a proper ink viscosity, the content of these coloring materials in the ink is preferably 0.1 to 15% by weight, more preferably 0.1 to 10% by weight.

When a disperse dye or pigment is used as the coloring material for the ink, it is generally necessary to use a dispersing agent or the like to disperse such a dye or pigment in the resulting ink. When a self-dispersing pigment is used as the pigment, however, the amount of the dispersing agent to be added can be reduced, or any dispersing agent need not be added. It is hence preferable to use such a self-dispersing pigment because the effects of the present invention are more markedly achieved.

In addition to the above-described components, the content of water as a liquid medium for dissolving or dispersing the coloring material therein as recited in (E) is desirably within the range of from 10 to 95% by weight, preferably from 25 to 93% by weight, more preferably from 40 to 90% by weight based on the total weight of the ink. As the water used in the present invention, ion-exchanged water is preferably used.

In the ink according to the present invention, such a water-soluble organic solvent as mentioned below is used in combination, whereby the effects of the present invention can be more markedly achieved.

Specific examples of such a water-soluble organic solvent include alkyl alcohols having 1 to 5 carbon atoms, such as methyl alcohol, ethyl alcohol, n-propyl alcohol, isopropyl alcohol, n-butyl alcohol, sec-butyl alcohol, tert-butyl alcohol, isobutyl alcohol and n-pentanol; amides such as dimethylformamide and dimethylacetamide; ketones and ketone alcohols such as acetone and diacetone alcohol; ethers such as tetrahydrofuran and dioxane; addition copolymers of oxyethylene, or oxypropylene such as dipropylene glycol; alkylene glycols such as ethylene glycol, propylene glycol and trimethylene glycol; triols such as glycerol, trimethylolethane and 1,2,6-hexanetriol; bishydroxyethyl sulfone; lower alkyl glycol ethers such as ethylene glycol monomethyl (monoethyl or monobutyl) ether, diethylene glycol monomethyl (monoethyl or monobutyl) ether and triethylene glycol monomethyl (monoethyl or monobutyl) ether; lower dialkyl glycol ethers such as triethylene glycol dimethyl (or diethyl) ether and tetraethylene glycol dimethyl (or diethyl) ether; alkanolamines such as monoethanolamine, diethanolamine and triethanolamine; sulfolane; N-methyl-2-pyrrolidone; 2-pyrrolidone; and 1,3-dimethyl-2-imidazolidinone. Among these, water-soluble organic solvents such as ethylene glycol, glycerol, 1,2,6-hexanetriol, ethyl alcohol, isopropyl alcohol and bishydroxyethyl sulfone are preferred.

When an acid dye or the dye represented by Formula (I) is used as the coloring material in the ink according to the present invention, there is a possibility that by a peroxide of diethylene glycol, the physical properties of the resulting ink may be changed, or ink communicating members may be affected. In this case, a buffer is added into such an ink, whereby such a problem can be prevented. In this case, for example, a lithium acetate is preferably added as a buffer to the ink to keep the pH of the ink within a weak alkaline region.

Into the inks according to the present invention, may be incorporated additives for imparting the desired performance to the inks, such as viscosity modifiers, preservatives, antioxidants, rust preventives, mildewproofing agents and chelating agents, in addition to the above-described components, as needed.

(Ink-Jet Recording Apparatus)

Figure 2:
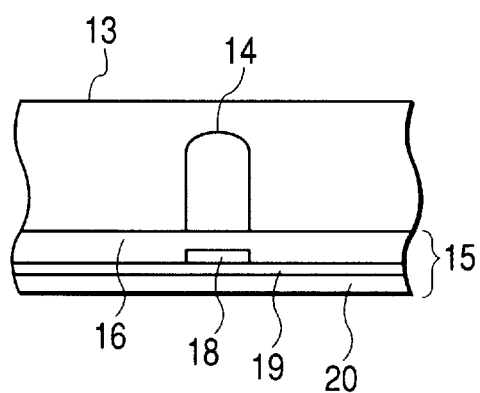
FIG. 2 is a cross-sectional view taken along line 2—2 in FIG. 1.
Figure 3:
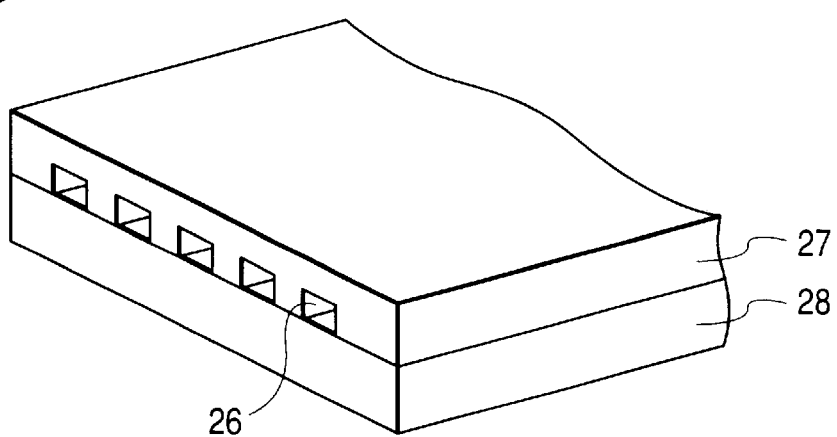
FIG. 3 schematically illustrates a multi-head.

As a component constituting an ink-jet recording apparatus, an exemplary construction of a head, which is a main component of an apparatus making good use of thermal energy is first shown in FIGS. 1, 2 and 3. FIG. 1 is a cross-sectional view of a head 13 taken along the flow path of an ink, and FIG. 2 is a cross-sectional view taken along line 2—2 in FIG. 1. The head 13 is formed by bonding a glass, ceramic, silicon or plastic plate, or the like having a flow path (nozzle) 14 through which an ink 21 is passed, to a heating substrate 15. The heating substrate 15 is composed of a protective layer 16 made of silicon oxide, silicon nitride, silicon carbide or the like, electrodes 17-1 and 17-2 formed of aluminum, gold, aluminum-copper alloy or the like, a heating resistor layer 18 formed of a high-melting material such as $HfB_2$, TaN or TaAl, a heat accumulating layer 19 formed of thermally oxidated silicon, aluminum oxide or the like, and a substrate 20 made of silicon, aluminum, aluminum nitride or the like having a good heat radiating property.

Now, upon application of pulsed electric signals to the electrodes 17-1 and 17-2 of the head 13, the heating substrate 15 rapidly generates heat at the region shown by "n" to form bubbles in an ink which is in contact with this region. A meniscus 23 of the ink is projected by the pressure thus produced, and the ink is ejected from an ejection orifice 22 through the nozzle 14 of the head 13 toward a recording medium 25 in the form of minute droplets 24.

FIG. 3 illustrates an appearance of a multi-head composed of an array of a number of heads as shown in FIG. 1. The multi-head is formed by closely bonding a glass plate 27 having multiple grooves 26 to a heating head 28 similar to that described in FIG. 1.

Figure 4:
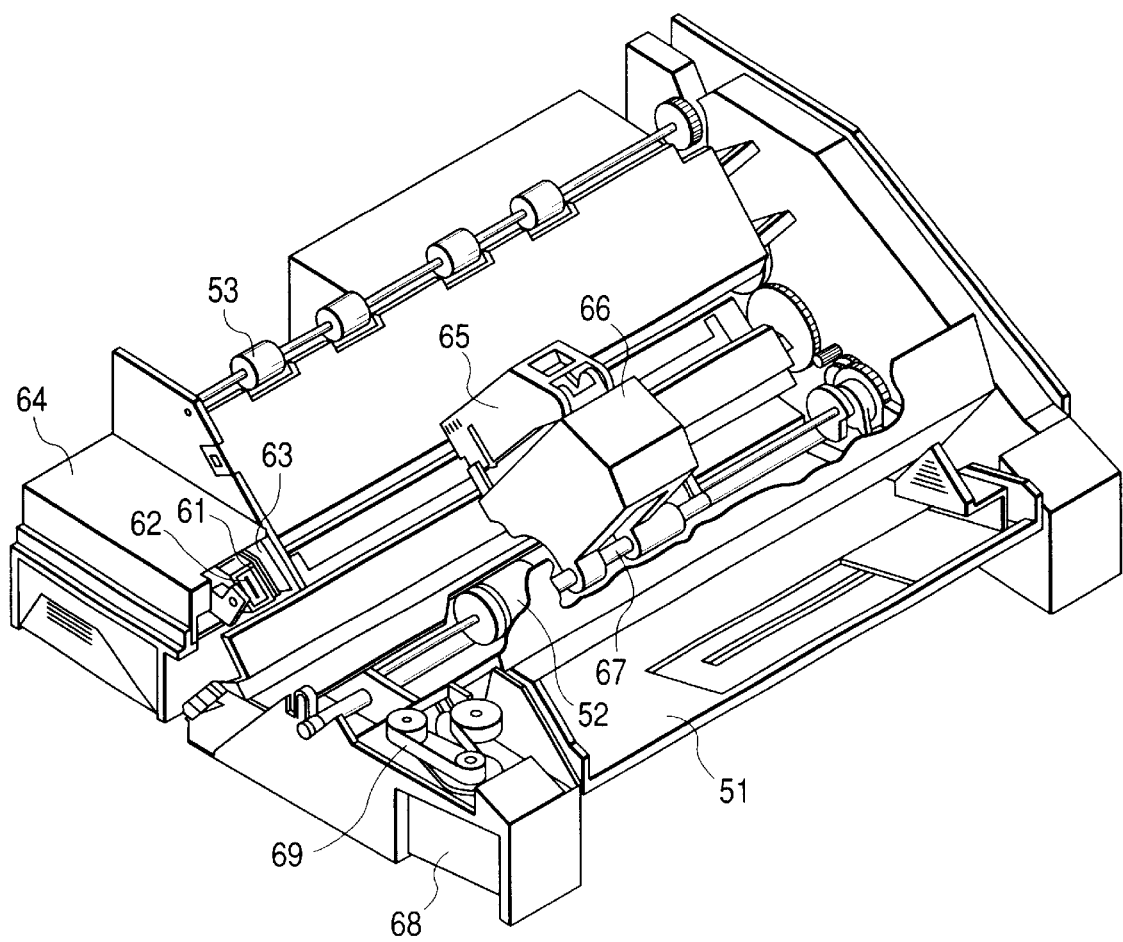
FIG. 4 is a schematic perspective view illustrating an embodiment of an ink-jet recording apparatus according to the invention.

FIG. 4 illustrates an example of an ink-jet recording apparatus in which such a head as described above has been incorporated. In FIG. 4, reference numeral 61 designates a blade serving as a wiping member, one end of which is a stationary end held by a blade-holding member to form a cantilever. The blade 61 is provided at a position adjacent to a recording region by a recording head 65, and in FIG. 4, is held in such a form that it protrudes into the course through which the recording head 65 is moved. Reference numeral 62 indicates a cap for the face of ejection openings of the recording head 65, which is provided at a home position adjacent to the blade 61, and is so constructed that it moves in a direction perpendicular to a direction in which the recording head 65 is moved, and comes into contact with the face of the ejection openings to cap it. Reference numeral 63 denotes an ink absorbing member provided adjoiningly to the blade 61 and, similar to the blade 61, held in such a form that it protrudes into the course through which the recording head 65 is moved. The above-described blade 61, cap 62 and ink absorbing member 63 constitute an ejection-recovery portion 64, where the blade 61 and ink absorbing member 63 remove water, dust and/or the like from the face of the ink-ejecting openings.

Reference numeral 65 designates the recording head having an ejection-energy-generating means and serving to eject the ink onto a recording medium set in an opposing relation to the ejection opening face provided with the ejection openings to conduct recording. Reference numeral 66 indicates a carriage on which the recording head 65 is mounted so that the recording head 65 can be moved. The carriage 66 is slidably interlocked with a guide shaft 67 and is connected (not illustrated) at its part to a belt 69 driven by a motor 68. Thus, the carriage 66 can be moved along the guide shaft 67, and hence the recording head 65 can be moved from the recording region to a region adjacent thereto. Reference numerals 51 and 52 denote a feeding part from which the recording medium is inserted, and feed rollers driven by a motor (not illustrated), respectively. With such a construction, the recording medium is fed to the position opposite to the ejection opening face of the recording head 65, and discharged from a discharge section provided with discharge rollers 53 with the progress of recording.

In the above construction, the cap 62 in the ejection-recovery portion 64 is receded from the path of motion of the recording head 65 when the recording head 65 is returned to its home position after completion of recording, and the blade 61 remains protruded into the path of motion. As a result, the ejection opening face of the recording head 65 is wiped. When the cap 62 comes into contact with the ejection opening face of the recording head 65 to cap it, the cap 62 is moved so as to protrude into the path of motion of the recording head 65. When the recording head 65 is moved from its home position to the position at which recording is started, the cap 62 and the blade 61 are at the same positions as the positions for the wiping as described above. As a result, the ejection opening face of the recording head 65 is also wiped at the time of this movement.

The above movement of the recording head 65 to its home position is made not only when the recording is completed or the recording head 65 is recovered for ejection, but also when the recording head 65 is moved between recording regions for the purpose of recording, during which it is moved to the home position adjacent to each recording region at given intervals, where the ejection opening face is wiped in accordance with this movement.

Figure 5:
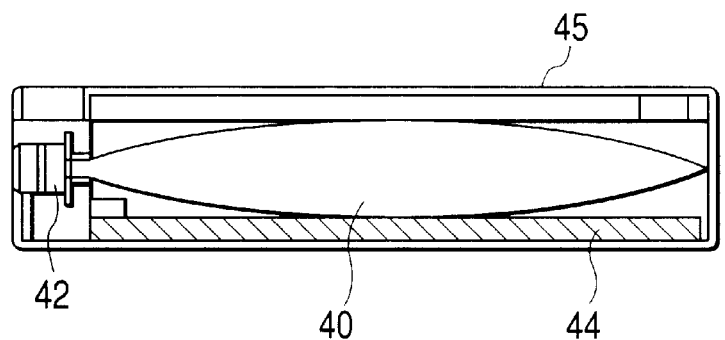
FIG. 5 is a longitudinal cross-sectional view illustrating an embodiment of an ink cartridge according to the invention.

FIG. 5 illustrates an exemplary ink cartridge 45 in which an ink to be fed to a recording head through an ink-feeding member (not illustrated), for example, a tube is contained. Here, reference numeral 40 designates an ink container portion containing the ink to be fed, as exemplified by a bag for the ink. One end thereof is provided with a stopper 42 made of rubber. A needle (not illustrated) may be inserted into this stopper 42 so that the ink in the bag 40 for the ink can be fed to the head. Reference numeral 44 indicates an absorbing member for receiving a waste ink. It is preferred that the ink container portion 40 be formed of a polyolefin, in particular, polyethylene, at its surface with which the ink comes into contact.

Figure 6:
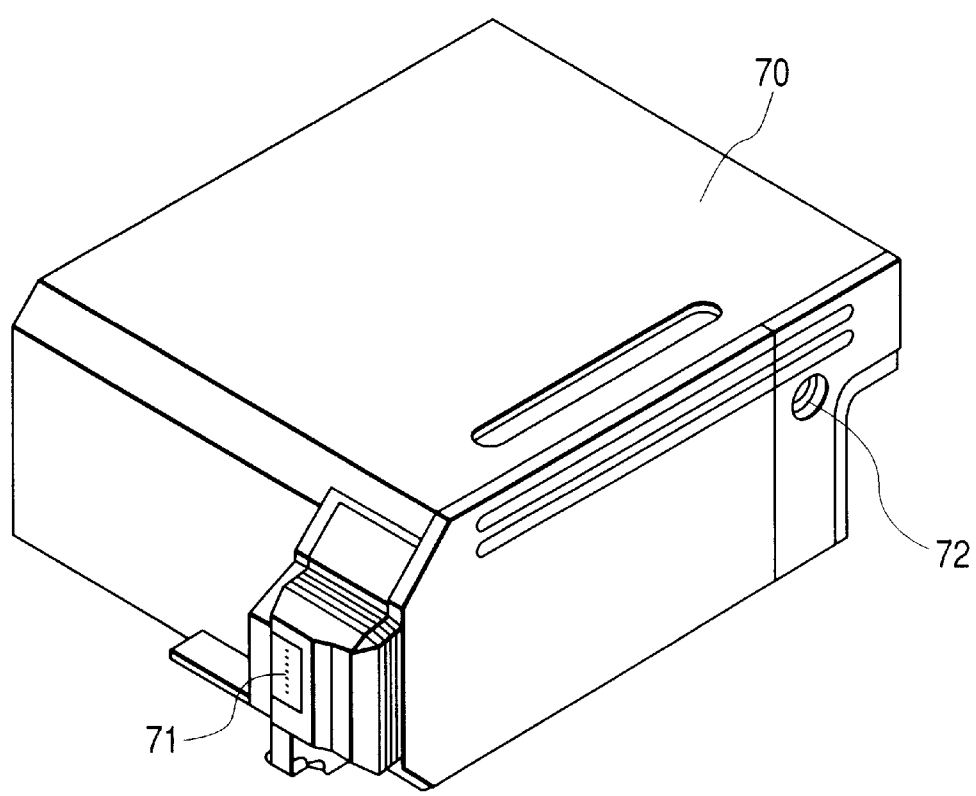
FIG. 6 is a perspective view illustrating an exemplary recording unit.

The ink-jet recording apparatus according to the present invention are not limited to the apparatus as described above in which the head and the cartridge are separately provided. Therefore, a device in which these members are integrally formed as shown in FIG. 6 can also be preferably used. In FIG. 6, reference numeral 70 designates a recording unit, in the interior of which an ink container portion containing an ink, for example, an ink absorbing member, is contained. The recording unit 70 is so constructed that the ink in such an ink absorbing member is ejected in the form of ink droplets through a head 71 having a plurality of orifices.

Polyurethanes or polyolefins are preferably used as a material for the ink absorbing member.

The ink container portion may be constructed without using the ink absorbing member by a bag for the ink in the interior of which a spring or the like is provided. Reference numeral 72 indicates an air passage for communicating the interior of the recording unit 70 with the atmosphere. This recording unit 70 is used in place of the recording head 65 of the recording apparatus shown in FIG. 4, and is detachably installed on the carriage 66.

Figure 7:
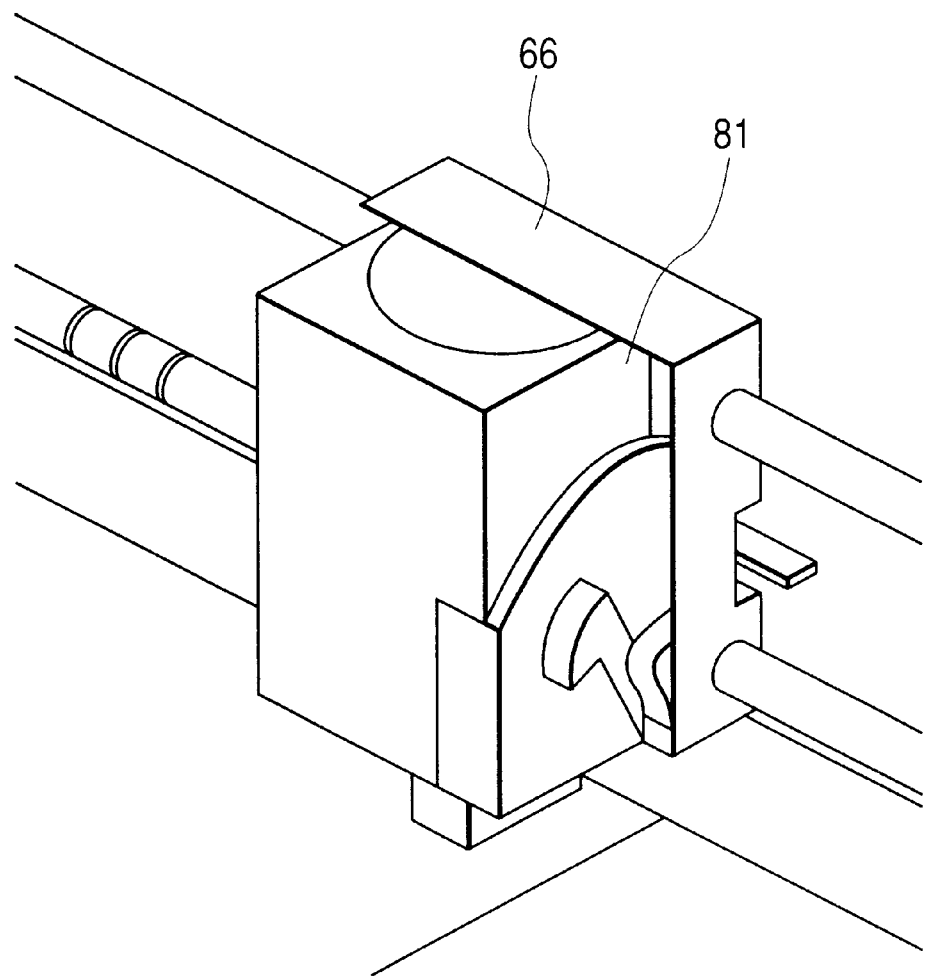
FIG. 7 is a schematic perspective view illustrating a state that a recording head has been mounted on a carriage.

When the ink-jet recording process according to the present invention is executed, for example, an ink-jet printer, in which the recording head shown in FIG. 3 has been mounted on a carriage, is used. FIG. 7 is a schematic perspective view illustrating an example thereof. In FIG. 7, reference numeral 81 indicates a recording head for ejecting a pigment ink therefrom. The ink is ejected from this recording head in response to recording signals to a recording medium.

Figure 8:
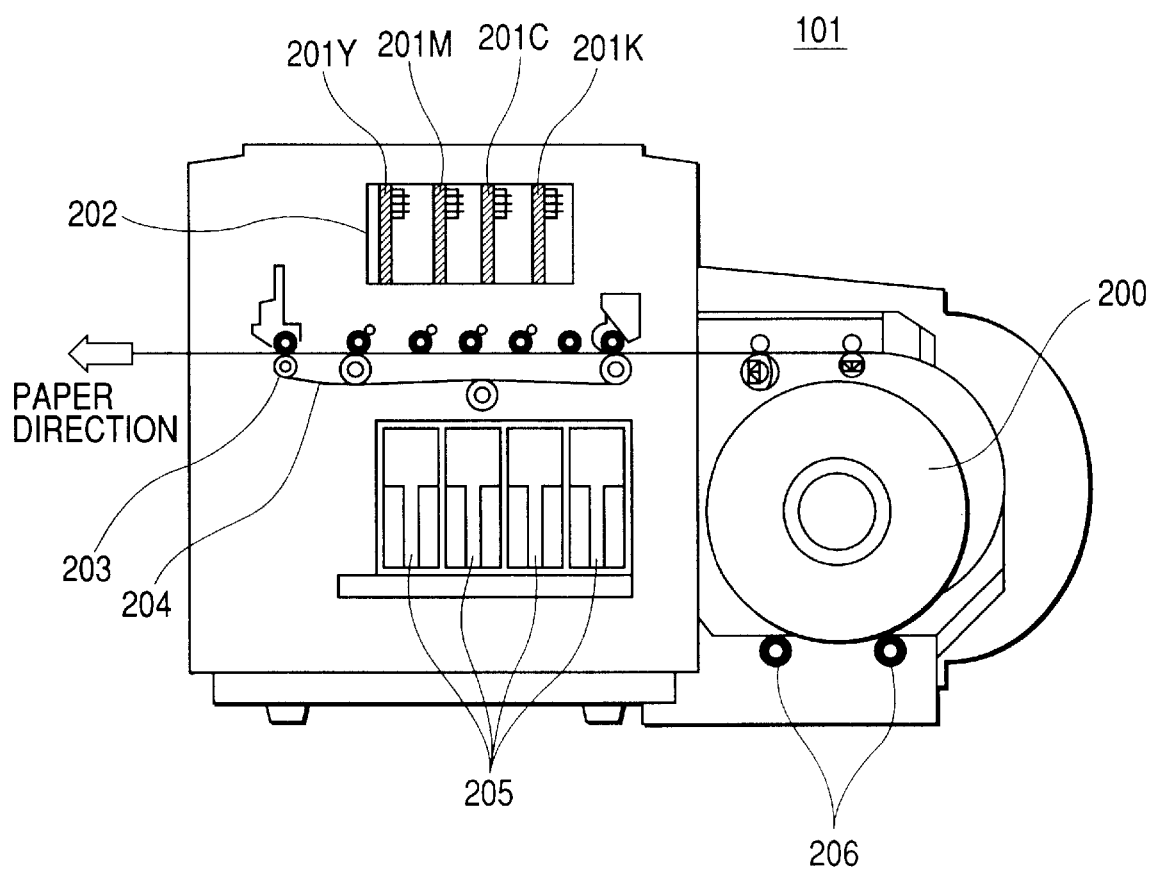
FIG. 8 is a sectional side elevation view illustrating an embodiment of an interior structure of an ink-jet recording apparatus according to the invention.

FIG. 8 is a sectional side elevation view illustrating an interior structure of a color recording apparatus used for conducting recording in accordance with the ink-jet recording method that is a typical embodiment of the present invention. In such an apparatus, a stationary, long, full-line recording head having a recording width corresponding to the width of a recording medium is equipped as a recording head. This recording apparatus is particularly suitable for use in recording a color image on a recording medium such as label paper at a high speed.

In FIG. 8, the recording apparatus 101 feeds a rolled paper 200, which is a recording medium, within the recording apparatus by paper feed rollers 206 upon execution of a recording operation. Within the recording apparatus, the rolled paper 200 is conveyed in a direction of an arrow by conveyance rollers 203 and a conveyer belt 204. The recording apparatus is equipped with a head unit 202 in which four full-line recording heads 201K, 201C, 201M and 201Y for ejecting respective inks of black (K), cyan (C), magenta (M) and yellow (Y) have been installed to record a color image on the rolled paper 200 with inks fed from four ink cartridges 205 containing the respective inks of Y, M, C and K.

Figure 9:
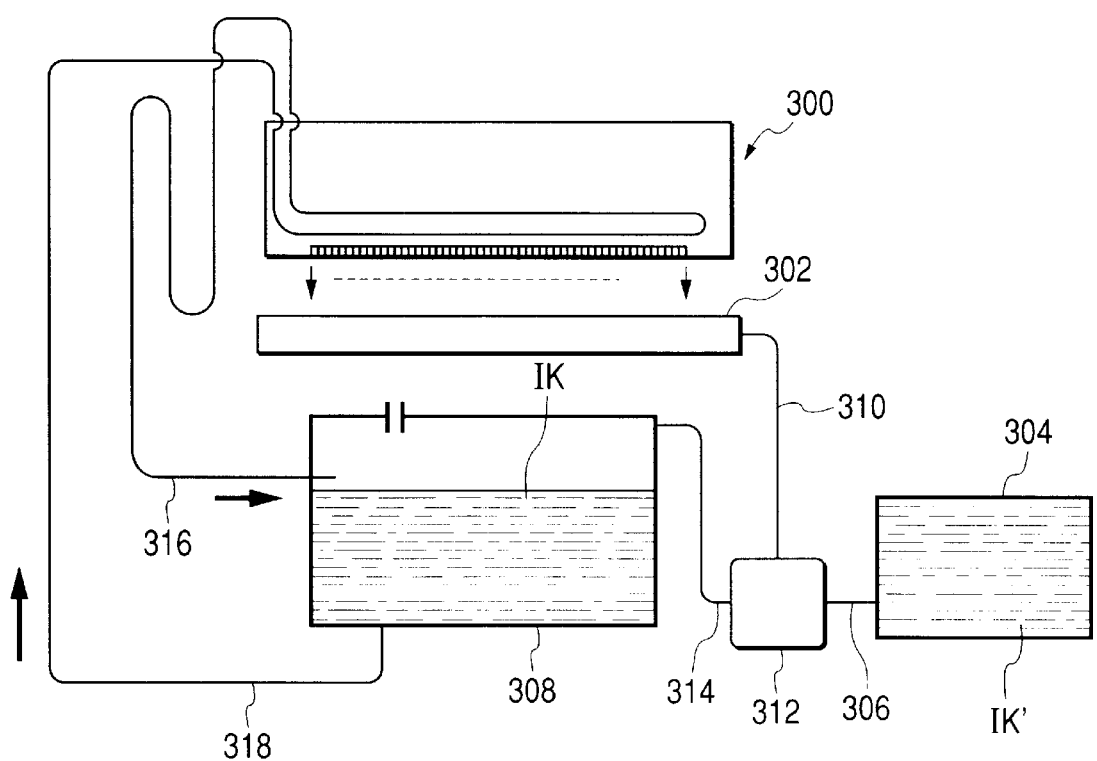
FIG. 9 schematically illustrates an exemplary recycling system of an ink-jet printer having a recycle mechanism of a recovered ink.

FIG. 9 illustrates an exemplary recycling system, in which an ink-jet printer according to the present invention with such a long, stationary recording head as described above employs a recycling method in which part of an ink is recovered after passing through a nozzle so that recovered ink is used again in recording. In such a recycling system, a recording head 300 is subjected to a recovery operation or preliminary ejection while coming into close contact with an ink-receiving member 302. The ink ejected from the recording head 300 is collected by the ink-receiving member 302. The collected ink is returned to an ink subtank 308 by a recycle pump 312 provided between the ink-receiving member 302 and the ink subtank 308.

The recycle pump 312 has two inlet ports respectively connected to an end of an ink feed passage 310 and an end of a feed passage 306 from a main tank 304, and an outlet port connected to an end of an ink feed passage 314. Incidentally, the recycle pump 312 is operated at a prescribed timing by a control unit (not illustrated). In addition, an ink feed passage 318 connected to the recording head 300 and a return passage 316 are connected to the ink subtank 308.

The ink used in the recovery treatment or preliminary ejection is collected in the ink subtank 308 through the recycling system, and the collected ink is mixed with an ink within the main tank 304 so as to permit reuse. The ink collected by the ink-receiving member 302 may also be returned once to the main tank 304 and then fed to the ink subtank 308 together with the ink in the main tank 304 to reuse.

The present invention will hereinafter be described more specifically by the following Examples and Comparative Examples. However, the present invention is not limited to these examples.

EXAMPLES 1 TO 8 AND COMPARATIVE EXAMPLES 1 TO 5

After respective ink components were mixed and stirred in accordance with their corresponding compositions shown in Table 1, the resultant mixtures were separately filtered through a fluoropore filter to provide inks according to EXAMPLEs 1 to 8 and COMPARATIVE EXAMPLEs 1 to 5.

TABLE 1

|  | (A) Content (% by weight) | (B) Component | (B) Content (% by weight) | (C) Component | (C) Content (% by weight) | (D) Component | (D) Content (% by weight) | (E) Content (% by weight) | Li acetate Content (% by weight) |
|---|---|---|---|---|---|---|---|---|---|
| Ex. 1 | 11 | B-1 | 14 | C-1 | 10 | Y-1 | 2 | 63.0 | — |
| Ex. 2 | 4 | B-1 | 5 | C-2 | 4 | M-1 | 1.5 | 85.4 | 0.1 |
| Ex. 3 | 13 | B-2 | 5 | C-2 | 3 | C-1 | 2 | 77.0 | — |
| Ex. 4 | 10 | B-1 | 10 | C-1 | 5 | K-1 | 3 | 71.9 | 0.1 |
| Ex. 5 | 2 | B-1 | 8 | C-1 | 18 | Y-2 | 2 | 70.0 | — |
| Ex. 6 | 17 | B-1 | 8 | C-3 | 2 | M-2 | 2 | 71.0 | — |
| Ex. 7 | 12 | B-2 | 2 | C-1 | 10 | C-2 | 2 | 74.0 | — |
| Ex. 8 | 6 | B-1 | 16 | C-1 | 8 | K-2 | 15 | 55.0 | — |
| Comp. Ex. 1 | 0 | B-1 | 14 | C-1 | 10 | Y-1 | 2 | 74.0 | — |
| Comp. Ex. 2 | 13 | B-2 | 0 | C-2 | 3 | C-1 | 2 | 82.0 | — |
| Comp. Ex. 3 | 2 | B-1 | 8 | C-1 | 0 | Y-2 | 2 | 88.0 | — |
| Comp. Ex. 4 | 3 | B-1 | 3 | C-1 | 3 | K-1 | 3 | 87.9 | 0.1 |
| Comp. | 11 | B-2 | 20 | C-2 | 10 | Y-1 | 2 | 57.0 | — |

TABLE 1-continued

| (A) Content (% by weight) | (B) Component | (B) Content (% by weight) | (C) Component | (C) Content (% by weight) | (D) Component | (D) Content (% by weight) | (E) Content (% by weight) | Li acetate Content (% by weight) |
|---|---|---|---|---|---|---|---|---|
| Ex. 5 | | | | | | | | |

(Note)
(A): Diethylene glycol.
(B): Trimethylolpropane and/or ethyleneurea
B-1: Trimethylolpropane
B-2: Ethyleneurea.
(C): Glycol having a vapor pressure lower than that of diethylene glycol at 20° C.
C-1: Triethylene glycol
C-2: Tetraethylene glycol
C-3: Polyethylene glycol (weight average molecular weight: 400).
(D): Coloring material
Y-1: C.I. Direct Yellow 86
M-1: Dye represented by Formula (I)
C-1: C.I. Direct Blue 199
K-1: C.I. Food Black 2
Y-2: C.I. Acid Yellow 132
M-2: C.I. Acid Red 94
C-2: C.I. Acid Blue 9
K-2: CABOJET-200 (product of Cabot Co., dispersion containing 20% of black pigment).
(E): Ion-exchanged water.

Each of the inks obtained in EXAMPLEs 1 to 8 and COMPARATIVE EXAMPLEs 1 to 5 was charged into an ink tank (internal volume: 200 ml) of a color bubble jet card printer (trade name: P-400CII, manufactured by Canon Inc.), and the ink tank was then installed in the printer to form an image. In the card printer, a long recording head is provided, and it is fixed during printing as illustrated in FIGS. 8 and 9 and so constructed that an ink ejected from the head by an operation such as pressure recovery operation or preliminary ejection can be returned to the ink tank to permit recycling of the ink. In this printer, about 3.6 ml of the ink is ejected in every pressure recovery operation for each ink. Images were formed under the following respective conditions to evaluate the inks as to the following items from the resultant images.

<Evaluation Items>

(1) Start-Up Property:

After the printer was left to stand for 2 hours under an environment of 25° C. and 10% humidity with a power source of the printer shut off and additionally for 2 hours under conditions of normal temperature and humidity (25° C., 60% humidity), the power source was turned on to confirm an initial printed condition.

The evaluation was made in accordance with the following standard. The evaluation results are shown in Table 2.
  A: No difference was obserbed from the printed state before left to stand;
  B: Slight difference was obserbed from the printed state before left to stand, but caused no problem in printing;
  C: Considerable difference was obserbed from the printed state before left to stand.

(2) Resistance to Crusting:

After the recording head of P-400CII was taken out of the main body and left to stand for 2 weeks under an environment of 35° C. and 10% humidity, it was mounted again on the main body to check whether printing was able to be resumed or not after an ordinary recovery operation. The evaluation was made in accordance with the following standard. The evaluation results are shown in Table 2.
  A: Resumed after one recovery operation;
  B: Resumed after several recovery operations
  C: Not resumed by the recovery operation.

(3) Ejection Stability in Recycling of Ink to Reuse:

P-400CII was used to continuously print a character pattern until each ink sample within the cartridge was used up to visually evaluate the character quality of the prints. Incidentally, a pressure recovery operation was conducted 30 times (3.6×30=118 ml) in total until the completion of the printing. The evaluation was made in accordance with the following standard. The evaluation results are shown in Table 2.
  A: No difference in character quality was obserbed between the beginning of the use of the cartridge and the point just before the ending thereof;
  B: Slight difference in character quality was obserbed between the beginning of the use of the cartridge and the point just before the ending thereof;
  C: Considerable difference in character quality was obserbed between the beginning of the use of the cartridge and the point just before the ending thereof.

TABLE 2

| | Evaluation results | | |
|---|---|---|---|
| | (1) | (2) | (3) |
| EXAMPLE 1 | A | A | A |
| EXAMPLE 2 | A | A | A |
| EXAMPLE 3 | A | A | A |
| EXAMPLE 4 | A | A | A |
| EXAMPLE 5 | B | B | A |
| EXAMPLE 6 | A | B | A |
| EXAMPLE 7 | B | B | B |
| EXAMPLE 8 | B | B | B |
| COMP. EXAMPLE 1 | C | C | C |
| COMP. EXAMPLE 2 | C | C | B |
| COMP. EXAMPLE 3 | C | C | C |
| COMP. EXAMPLE 4 | C | C | B |
| COMP. EXAMPLE 5 | B | A | C |

(Note)
(1) Start-up property
(2) Resistance to crusting
(3) Ejection stability in recycling.

When the inks according to EXAMPLEs 1 to 8 were used, it has been confirmed that substantially the same recording properties of ink are obserbed for the inks before the recycling and the inks subjected to the pressure recovery operation 30 times.

From the above-described results, it was confirmed that the inks according to the present invention were excellent ink-jet inks, for even when they are recycled to reuse, the ejection properties are substantially the same as those of the inks before the recycling, and the start-up property and resistance to crusting were also good, and so they can be preferably used in various types of ink-jet recording apparatus.

According to the present invention, as described above, there can be provided ink-jet inks which are excellent in start-up properties and resistance to crusting, and hard to undergo a change in ink properties even when they are recycled to reuse, and stably show good ejection properties, and so ink-jet recording with constant good ejection properties becomes feasible.

What is claimed is:

1. An ink-jet ink comprising (A) diethylene glycol, (B) at least one of trimethylolpropane and ethyleneurea, (C) a glycol having a vapor pressure lower than that of diethylene glycol at 20° C., (D) a coloring material, and (E) water, wherein the total amount of the components (A), (B) and (C) is 10 to 40% by weight based on the total weight of the ink.

2. The ink-jet ink according to claim 1, wherein the component (D) is a dye.

3. The ink-jet ink according to claim 1, wherein the component (A) is contained in an amount of from 1 to 20% by weight based on the total weight of the ink.

4. The ink-jet ink according to claim 1, wherein the component (B) is contained in an amount of from 1 to 20% by weight based on the total weight of the ink.

5. The ink-jet ink according to claim 1, wherein the component (C) is contained in an amount of from 1 to 20% by weight based on the total weight of the ink.

6. The ink-jet ink according to claim 1, wherein the ink is used in a recording apparatus in which part of an ink is collected after passing through a nozzle, so that the collected ink is used again in recording.

7. The ink-jet ink according to claim 1, wherein the ink is used in a recording apparatus in which a continuous time period during which an ink within a nozzle confronts a recording surface is not less than 5 seconds.

8. The ink-jet ink according to claim 1, wherein the ink is used in a recording apparatus of which a head is fixed during printing.

9. An ink cartridge comprising an ink container portion containing the ink-jet ink according to claim 1.

10. A recording unit comprising an ink container portion containing the ink-jet ink according to claim 1, and a head portion for ejecting the ink therefrom.

11. The recording unit according to claim 10, wherein the head portion is equipped with a recording head in which thermal energy is applied to an ink, thereby ejecting the ink from an orifice.

12. An ink-jet recording process, comprising the step of ejecting an ink from an orifice toward a recording surface with an On-Demand system by applying energy to the ink, wherein the ink comprises (A) diethylene glycol, (B) at least one of trimethylolpropane and ethyleneurea, (C) a glycol having a vapor pressure lower than that of diethylene glycol at 20° C., (D) a coloring material, and (B) water, and wherein the total amount of the components (A), (B) and (C) is 10 to 40% by weight based on the total weight of the ink.

13. The ink-jet recording process according to claim 12, wherein the energy is thermal energy.

14. An ink-jet recording apparatus, comprising a recording head for ejecting the ink-jet ink according to claim 1, and an ink cartridge having an ink container portion containing the ink.

15. The ink-jet recording apparatus according to claim 14, wherein the recording head is a head which ejects an ink by applying thermal energy to the ink.

16. An ink-jet recording apparatus, comprising a recording unit having an ink container portion containing the ink-jet ink according to claim 1 and a head for ejecting the ink therefrom.

17. The ink-jet recording apparatus according to claim 16, wherein the head ejects an ink by applying thermal energy to the ink.

18. An ink-jet recording apparatus, comprising an ink container portion containing the ink-jet ink according to claim 1, a recording head for ejecting the ink therefrom, and a means for collecting the ink ejected from the recording head in the ink container portion.

19. An ink-jet recording apparatus, comprising an ink container portion containing the ink-jet ink according to claim 1, a recording head for ejecting the ink therefrom, an ink-receiving member for receiving the ink ejected from the recording head, an ink flow path connecting the ink-receiving member to the ink container portion, and a pump for collecting the ink received with the ink-receiving member in the ink container portion.

20. An ink-jet recording process using the ink-jet recording apparatus according to claim 18, which comprises the step of ejecting an ink containing the ink-jet ink previously ejected at least once from the recording head.

21. An ink-jet recording process using the ink-jet recording apparatus according to claim 19, which comprises the step of ejecting an ink containing the ink-jet ink previously ejected at least once from the recording head.

22. An ink-jet recording process, comprising the step of ejecting an ink containing an ink-jet ink previously ejected at least once from a recording head, wherein said ink-jet ink is the ink-jet ink according to claim 1.

23. A method of stabilizing ink ejection properties in an ink-jet recording process comprising the step of ejecting an ink containing an ink-jet ink previously ejected at least once from a recording head, wherein the ink-jet ink comprises (A) diethylene glycol, (B) at least one of trimethylolpropane and ethyleneurea, (C) a glycol having a vapor pressure lower than that of diethylene glycol at 20° C., (D) a coloring material, and (B) water, wherein the total amount of the components (A), (B) and (C) is 10 to 40% by weight based on the total weight of the ink.

* * * * *

UNITED STATES PATENT AND TRADEMARK OFFICE
CERTIFICATE OF CORRECTION

PATENT NO. : 6,641,651 B2
DATED : November 4, 2003
INVENTOR(S) : Mariko Suzuki et al.

It is certified that error appears in the above-identified patent and that said Letters Patent is hereby corrected as shown below:

Column 5,
Lines 57-67, should be deleted.

Column 8,
Line 58, "are" should read -- is --.

Column 11,
Lines 51, 53, and 55, "obserbed" should read -- observed --;

Column 12,
Lines 36 and 39, "obserbed" should read -- observed --
Line 43, "erbed" should read -- erved --.

Column 13,
Line 1, "obserbed" should read -- observed --.

Signed and Sealed this

Twenty-seventh Day of July, 2004

JON W. DUDAS
*Acting Director of the United States Patent and Trademark Office*